Figure 9:
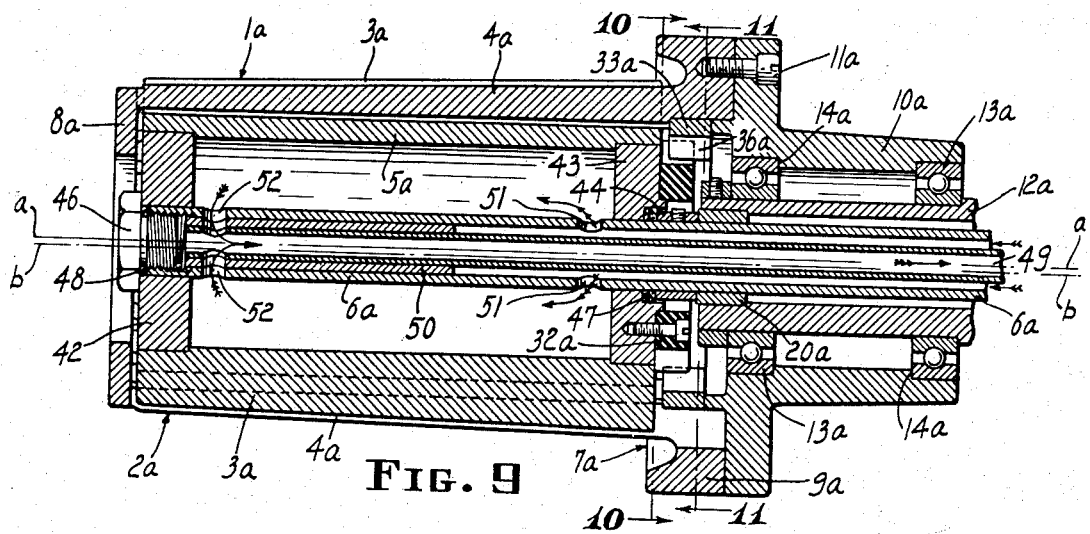

Sept. 2, 1941.   G. P. TORRENCE ET AL   2,255,017
THREAD ADVANCING REEL
Filed July 15, 1939   3 Sheets-Sheet 1
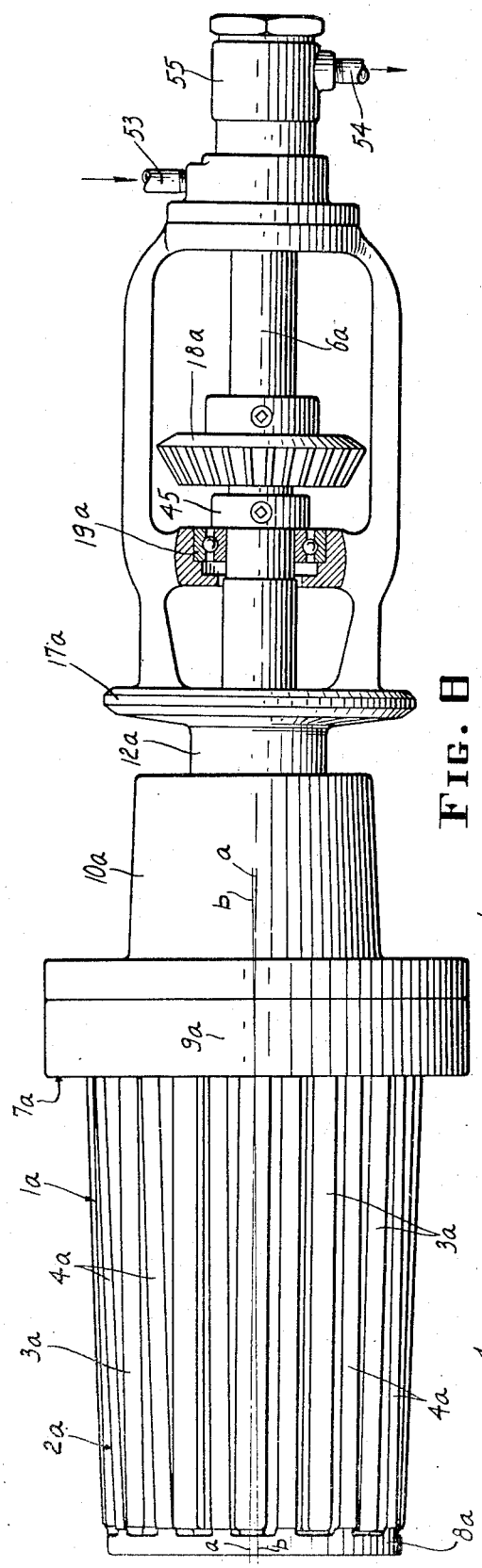
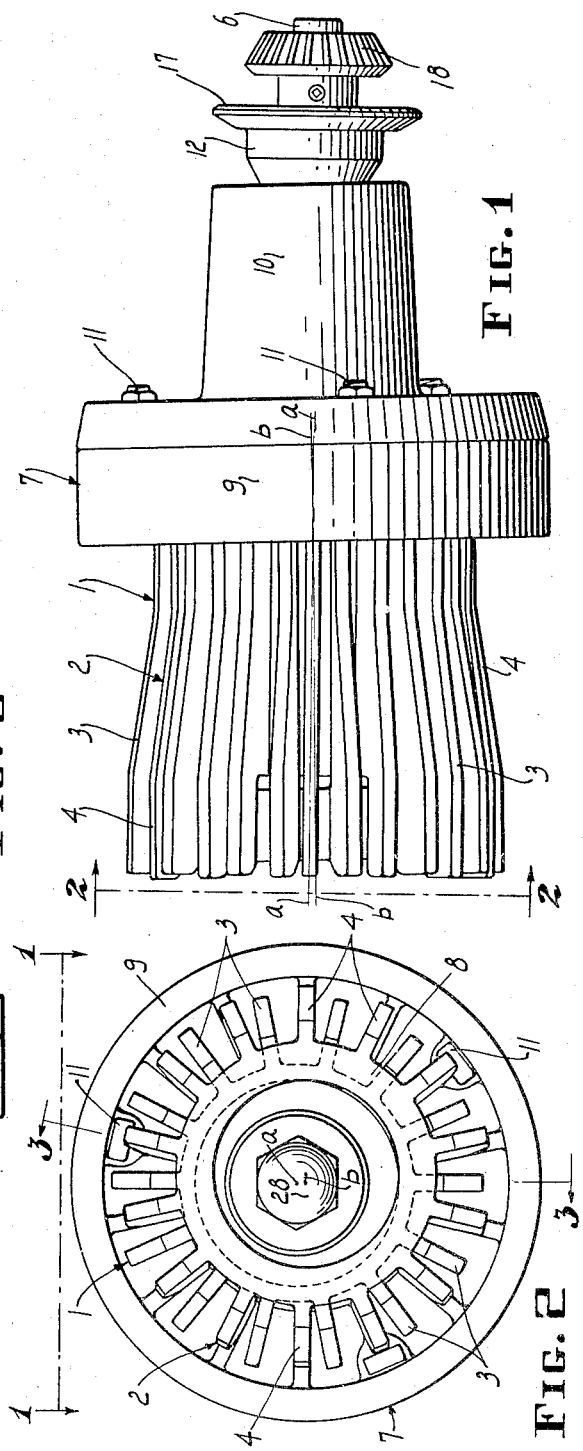
Inventors
GEORGE P. TORRENCE
RICHARD F. BERGMANN AND
WALTER F. KNEBUSCH
BY Charles S. Herrstrom
Attorney Sept. 2, 1941. G. P. TORRENCE ET AL 2,255,017
THREAD ADVANCING REEL
Filed July 15, 1939 3 Sheets-Sheet 2
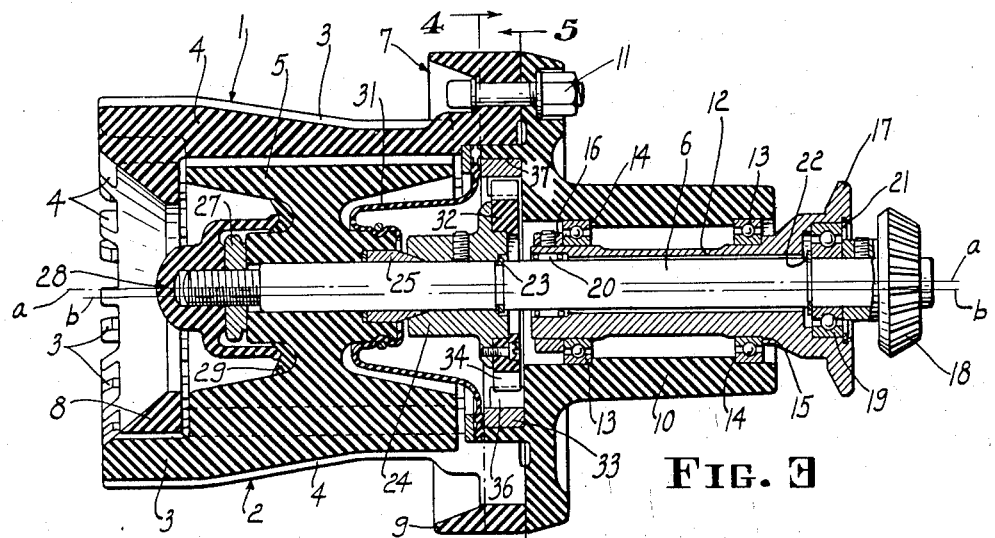
FIG. 3
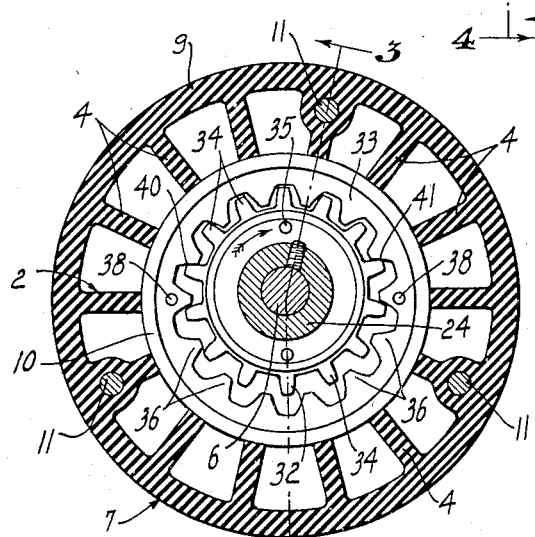
FIG. 4
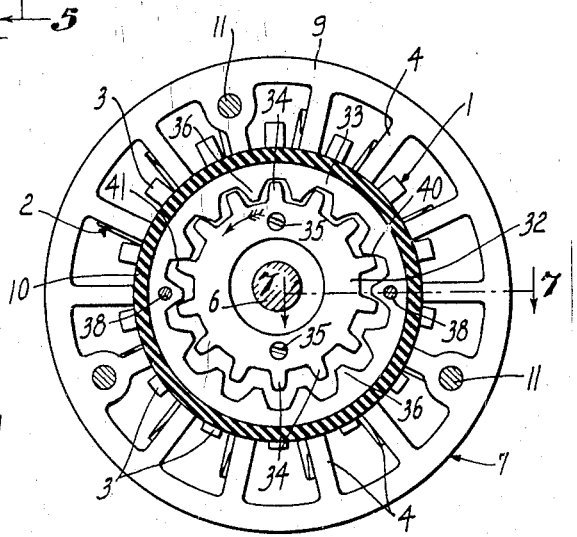
FIG. 5
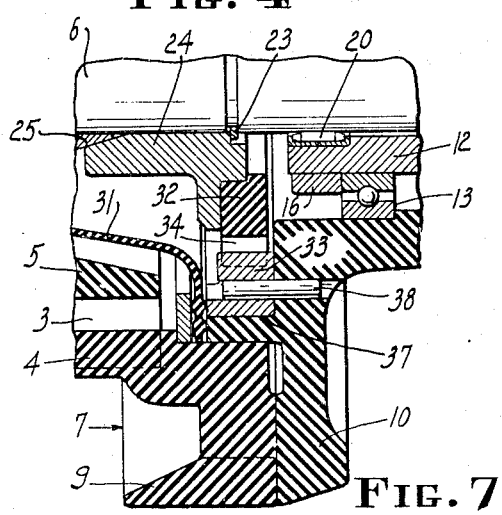
FIG. 7
FIG. 6
Inventors
GEORGE P. TORRENCE
RICHARD F. BERGMANN AND
WALTER F. KNEBUSCH
BY Charles E. Herrstrom
Attorney Sept. 2, 1941.    G. P. TORRENCE ET AL    2,255,017
THREAD ADVANCING REEL
Filed July 15, 1939    3 Sheets-Sheet 3

Inventors
GEORGE P. TORRENCE
RICHARD F. BERGMANN AND
WALTER F. KNEBUSCH
BY Charles E. Herrstrom
Attorney Patented Sept. 2, 1941

2,255,017

UNITED STATES PATENT OFFICE 2,255,017

THREAD ADVANCING REEL

George P. Torrence, Shaker Heights, Richard F. Bergmann, Lakewood, and Walter F. Knebusch, Rocky River, Ohio, assignors to Industrial Rayon Corporation, Cleveland, Ohio, a corporation of Delaware Application July 15, 1939, Serial No. 284,728

14 Claims. (Cl. 242—53)

This invention relates to reels of a kind upon which strip material such as thread, cord, tapes, bands, etc., hereinafter referred to as "thread," may be continuously but temporarily advanced in spaced, generally helical turns. More particularly, the invention relates to thread-advancing reels comprising two or more interdigitating reel members which, during rotation of the reel, cooperate to advance the thread lengthwise thereof. According to the invention, the improved thread-advancing reel includes means providing for the cooperative rotation of the reel members.

A thread-advancing reel of the type in which the invention may be employed is one made up of two interdigitating reel members each of which takes the form of a generally cylindrical set of longitudinally extending bar members mounted for rotation as a set about an axis displaced from the axis of rotation of the other set. The axis of rotation of each reel member preferably lies within the periphery defined by the bar members of the other reel member, the bar members of the two reel members being interleaved in alternating relation. One of said reel members, which may be referred to as the driving member, is usually positively rotated from a suitable source of power while the other member, which may be referred to as the driven member, is usually freely rotatably mounted, being driven by contact with the driving member.

Heretofore it has been the usual, but not invariable, practice to drive one reel member from the other by permitting the bar members of the driving reel member to contact with the bar members of the driven reel member. However, because of friction developed between the bar members at the points of contact, a marked tendency to wear occurs at these points. This tendency is aggravated by the fact that, because of the displaced relation of the axes of the reel members, the bar members of the two reel members slide with respect to each other at the points of contact. In actual practice, the bar members of the reel, particularly a reel intended for the drying of thread, are sometimes made of aluminum, a metal which has exceptional heat-conducting qualities but which wears readily as a result of frictional forces developed when one reel member is driven from the other by bar-to-bar contact.

Furthermore, flexing of the reel members occurs under the stresses imposed by the large number of thread turns on the reel, which flexing sometimes causes sufficient distortion to give the effect of wear in the reel members.

Irregularities in the bar members themselves also cause difficulties when the bar members of the reel members are permitted to come into contact during operation of the reel. As a practical matter, it is impossible to construct the reel members so that they are perfectly accurate as to dimensions, particularly if the reel members are of cast or molded construction. If the bar members of the reel members come into contact during operation of the reel, as when one reel member is driven from the other by bar-to-bar contact, such irregularities give rise to momentary variations in the relative speeds of rotation of the two reel members. Inasmuch as the thread wound about the reel is carried simultaneously by portions of the peripheries of both reel members, speed variations of the reel members cause stretching of those portions of the thread turns which are at the moment passing from one reel member to the other, thereby causing corresponding variations in the tension in the thread wound on the reel.

Since the positions of such irregularities in either or both of the reel members are fixed with respect to the reel members, the momentary relative speed fluctuations between the reel members occur when the reel members are in substantially the same positions in each revolution thereof. Consequently, a cumulative stretching action occurs; that is, substantially the same portion of the thread in each turn wound on the reel is stretched during each revolution of the reel. The resulting stretch is therefore not merely the small amount of stretch imparted by a single momentary speed variation between the reel members, but is much greater, being the cumulative effect of repeatedly stretching of the same portion of the thread as it advances lengthwise of the reel.

This localized stretching of the thread has been found to be greatly aggravated if an attempt is made to stretch the thread by flaring the reel so that it increases in diameter in the direction of travel of the thread.

The irregularities above described are particularly troublesome if wet thread, such, for example, as freshly spun artificial silk thread, is stored on a thread-advancing reel, for such thread is very delicate while wet, stretches readily, and easily acquires a set, particularly if stretched in the gel state. Such set persists in the finished product and is reflected as dye barré in fabrics formed from the thread. In practice, viscose artificial silk thread produced by a continuous process in which the thread is stored on reels subject to these difficulties has sometimes been found to be so seriously stretched at more or less regularly recurring intervals as to cause barré effects in the fabrics formed therefrom sufficient to render the fabrics unfit for the intended use.

In reels of this kind in which only one reel member is positively driven and the other, in order to permit of its being driven by bar-to-bar contact from the positively driven reel member, is freely rotatably mounted, difficulties also arise from backlash. Thus if the positively driven reel member is suddenly stopped or started, as a result, for example, of the employment of a jaw clutch, the bar members of the freely rotatably mounted reel member strike or are struck by those of the positively driven reel member. Sufficient inertia forces can be developed in this manner to break one or both of the reel members, particularly if they are of relatively frangible material such as a synthetic resin. Yet this cannot be avoided if one reel member is driven by bar-to-bar contact with the other, since the space between two adjacent bar members of one of the reel members is usually greater than the space occupied by the interposed bar member of the other reel member.

The present invention avoids these and other difficulties by providing means which serves at all times to locate the reel members with respect to each other so that even though they rotate simultaneously, the bar members never contact. Thus are avoided the detrimental results of wear, irregularities, and breakage due to backlash, making it possible to drive the reel members in such manner as to insure that the reel members making up the reel rotate at identical speeds at all times even though one reel member is driven from the other. In practice, the improvements of the present invention relating to means for maintaining the bar members out of contact at all times even though one reel member is driven by the other eliminate the usual difficulties arising out of irregularities in the shape of the reel members or out of differences in the speeds of rotation of the reel members.

For convenience, but in no sense of limitation, the invention will be described in connection with thread-advancing reels adapted for use in apparatus for the manufacture of artificial silk thread.

Figure 1 is a plan from line 1—1 of Figure 2 of a thread-advancing reel constituting one embodiment of the present invention. Figure 2 is an end elevation of the reel from line 2—2 of Figure 1. Figure 3 is a vertical sectional elevation of said reel from line 3—3 of Figures 2 and 4. Figure 4 is a cross sectional elevation of the reel from line 4—4 of Figure 3. Figure 5 is a cross sectional elevation of the reel from line 5—5 of Figure 3. Figure 6 is a detail sectional elevation, on an enlarged scale, corresponding to the lower central portion of Figure 3 showing the means for mounting one of the drive elements on one of the reel members. Figure 7 is a detail sectional elevation from line 7—7 of Figure 5, on the same enlarged scale as Figure 6, showing the means for mounting the drive element in the other of the reel members.

Figure 10:
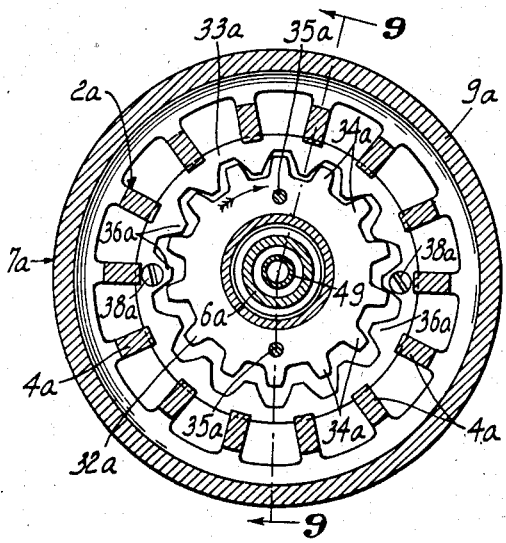
Figure 11:
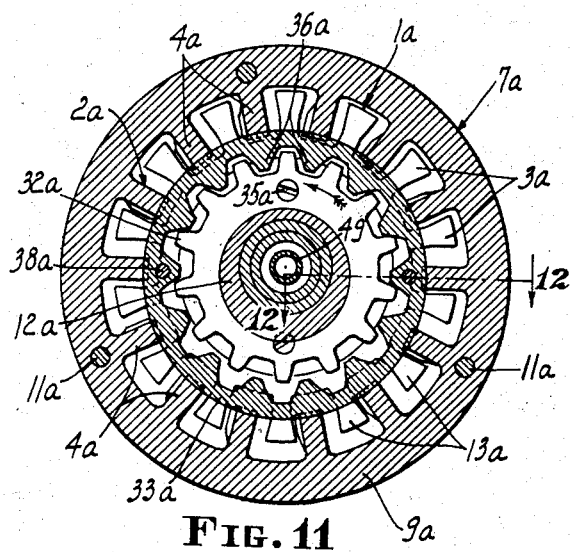
Figure 12:
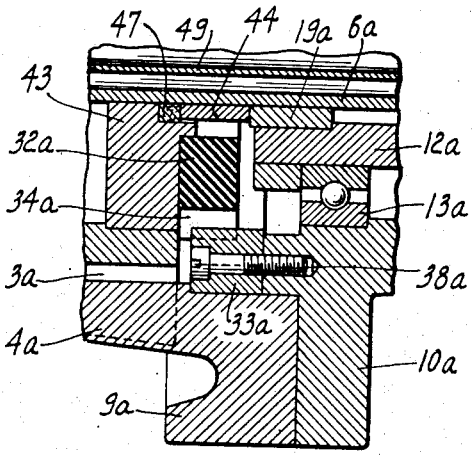
Figure 13:
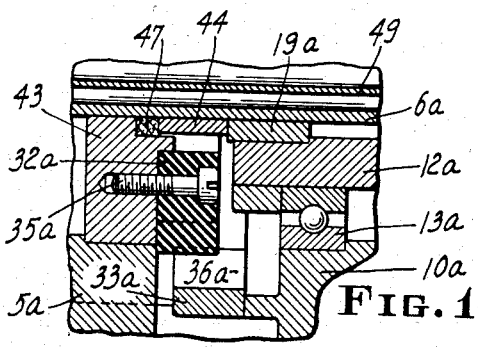

Figure 8 is a plan of a thread-advancing reel representing another embodiment of the invention. Figure 9 is a vertical sectional elevation of the reel corresponding generally to line 9—9 of Figure 10. Figure 10 is a cross sectional elevation of the reel from line 10—10 of Figure 9. Figure 11 is a cross sectional elevation of the reel from line 11—11 of Figure 9. Figure 12 is a detail sectional elevation, on an enlarged scale, corresponding to line 12—12 of Figure 11 showing the means for mounting one of the drive elements on one of the reel members of said reel. Figure 13 is a sectional elevation corresponding to the lower central portion of Figure 9, on the same enlarged scale as Figure 12, showing the means for mounting the drive element on the other reel member.

In the drawings, like reference characters refer to like parts throughout.

The reel illustrated in Figures 1 to 7, inclusive, comprises two rigid reel members 1 and 2 each of which is of generally circular cross section. Reel member 1 has a periphery formed of a plurality of spaced, longitudinally extending bar members 3. The periphery of reel member 2 comprises a plurality of spaced, longitudinally extending bar members 4. The bar members of the two reel members are disposed alternately as shown in Figures 1 and 2, each of the reel members being mounted to rotate about an axis slightly offset from and inclined to that of the other reel member. The inclined relationship is shown in Figures 1 and 2, while the offset arrangement is shown in Figure 2.

Because of the offset relation of the axes of the reel members 1 and 2, both reel members simultaneously carry the thread turns wound about the reel, the thread in each turn transferring from one reel member to the other during rotation of the reel. The inclined relationship of the reel members causes thread to advance lengthwise of the reel. The reel of Figures 1 to 7, as well as the reel of Figures 8 to 13, is of cantilever form; i. e., it is supported from one end only, and advances the thread from the supported to the unsupported end of the reel. In the reel of Figures 1 to 7, inclusive, the bar members are shaped in such manner that the cross section of the reel increases in the direction of travel of the thread, whereby the thread is stretched as it travels over the reel.

In the reel of the latter figures, reel member 1 comprises a generally cylindrical body portion 5 by means of which the reel member as a whole is mounted concentrically on drive shaft 6. To body portion 5 thereof are fixed a series of spaced, longitudinally extending bar members 3. Reel members 2, on the other hand, comprises a cage-like member 7 formed of spaced longitudinally extending bar members 4 having fixed thereto at the unsupported ends thereof an internal annular reinforcing member 8 over which the projecting ends of bar members 3 extend and having fixed to the supported ends thereof an external annular reinforcing member 9 by means of which said cagelike member is rigidly mounted, as by bolts 11, on rotatable supporting member 10.

Supporting member 10 is rotatably mounted on projecting frame member 12 by means of spaced antifriction bearings 13. The outer races of said bearings are located in the hub of member 10 against shoulders 14 and the inner races thereof are located on frame member 12 between shoulder 15 and collar 16. Member 10 is thus freely rotatably mounted in such manner that reel member 2; i. e., cagelike member 7 and supporting member 10, may rotate about an axis b—b disposed in the desired offset and inclined relation to axis a—a of drive shaft 6, which axis a—a constitutes the axis of rotation of reel member 1.

Frame member 12 is formed with a flange portion 17 at the rear thereof by means of which the reel assembly may be mounted in the thread-handling apparatus of which it forms a part. Drive shaft 6, adapted to be positively rotated by means of bevel gear 18 fixed thereto, is journalled in frame member 12, being supported by anti-friction bearings 19 in the rear portion of frame member 12 and by suitable bearings, such as needle bearing 20, in the front portion thereof. The outer race of antifriction bearings 19 is located between a shoulder in said frame member 12 and a snap ring 21, while the inner race is located between the hub of bevel gear 18 and a snap ring 22, as shown. In this manner, drive shaft 6 and reel member 1 mounted thereon are located against endwise movement.

Similarly, a snap ring 23 located in a suitably positioned groove in drive shaft 6 serves as a means for locating reel member 1. Flange member 24 is mounted on drive shaft 6, being located against snap ring 23 and locked in position on drive shaft 6 by suitable means as, for example, the set screw shown. Also mounted about said drive shaft is a member 25 embodying a frusto-conical portion adapted to fit in a cone-shaped recess in said flange member 24 and a portion of hexagonal cross section adapted to fit into a correspondingly shaped recess in said reel member 1. Through the agency of said member 25 reel member 1 is firmly held against said flange member 24 by means of a lock nut 27 threaded on the end of drive shaft 6 bearing against the hub portion of reel member 1.

If desired, a suitable cap nut 28, made of resistant material, may be threaded on the end of said drive shaft 6 to enclose the lock nut 27 and the end of drive shaft 6 to prevent the entrance of processing fluids of a corrosive nature. A resilient washer 29 may be provided in a groove in said reel member 1 to cooperate with said cap 28 and aid in preventing the entrance of processing fluids. A flexible seal 31 may be mounted between the reel member 1 and reel member 2 to prevent access of the processing fluids to the interior portions of the reel. The reel members 1 and 2 are preferably made of non-metallic material, such as hard rubber, Bakelite, or other synthetic resin; so that the reel as a whole is not affected by any processing medium applied to the thread stored thereon.

As is apparent from Figure 3, reel member 1, being rigidly mounted on drive shaft 6, is rotated therewith. Reel member 2, which is freely rotatably mounted on frame member 12, is driven from drive shaft 6, even though its axis is displaced therefrom, by the means shown in Figures 3 to 7, inclusive. Such means constitute a dentated driving element 32 rigidly and concentrically mounted with respect to the drive shaft 6 engaging a dentated driven element 33 rigidly and concentrically mounted with respect to reel member 2. Element 32 takes the form of a gearlike member having radially extending external teeth 34 which member is rigidly mounted on flange member 24, as by bolts 35 (Figures 3, 5 and 6). Element 33 takes the form of a gearlike member having radially extending internal teeth 36 rigidly mounted in a recess 37 in the supporting member 10 of reel member 2, as by pins 38 (Figures 3, 4 and 7). As is apparent, either or both of the members may be readily removed or replaced.

The teeth 34 of member 32 and teeth 36 of member 33 are preferably of curviform conjugate shapes, such as those shown; so that although neither member 32 nor member 33 rotates at a speed greater than that of the other, a smooth contact is provided and the reel members rotate uniformly at all times. The bar members 3 and 4 of the reel members 1 and 2 are therefore never allowed to come into contact, the drive for freely rotatable member 2 taking place entirely through drive members 32 and 33. Moreover, these members may be formed as in Figures 4 and 5 so that no backlash can occur, this because of the fact that, in this embodiment of the invention, two spaced teeth on each member contact, or nearly contact, corresponding teeth on the other gears on opposite sides. That is, one of the teeth 34 of member 32 contacts a corresponding tooth 36 of member 33 at point 40, while spaced therefrom another of the teeth 34 contacts a corresponding tooth 36 at point 41, the points of contact of these teeth being on opposite sides thereof. Consequently, there is no possibility of any appreciable backlash either in starting or stopping the reel.

While the reel of Figures 1 to 7, inclusive, is shown as adapted for stretching thread, it is apparent that its periphery may be of such contour that no stretch is imparted to the thread while it is stored thereon. The reel of these figures is shown as particularly adapted for handling wet thread, since it is of such construction that it is not attacked by processing liquids which might be applied to the thread stored on the reel. As shown in Figure 3, the drive elements 32 and 33 are located between reel members 1 and 2 at the rear portion of reel member 1, where they are entirely protected by flexible seal 31.

The reel of Figures 8 to 13, on the other hand, is particularly adapted to the drying of thread, for which purpose it is tapered toward the unsupported end thereof. The reel of these figures operates on the principle of the reel hereinabove described; that is, it comprises two rigid, interdigitating reel members 1a and 2a. Reel member 1a has a periphery formed of a plurality of spaced, longitudinally extending bar members 3a, while reel member 2a has a periphery formed of a plurality of spaced, longitudinally extending bar members 4a alternating with the bar members 3a of reel member 1a.

In this reel, reel member 1a is mounted concentrically upon and for rotation with a hollow drive shaft 6a journalled in frame member 12a as by bearings 19a and 20a (Figures 8 and 9). Reel member 2a is generally similar to the corresponding reel member of the embodiment hereinabove described in that it comprises a cagelike member 7a including spaced, longitudinally extending bar members 4a having fixed thereto at the unsupported ends thereof an annular reinforcing member 8a and, fixed to the supported ends thereof, an external annular reinforcing member 9a by means of which said cagelike member is rigidly mounted on supported member 10a, as by means of bolts 11a. Supported member 10a is rotatably mounted by means of spaced antifriction bearings 13a on projecting frame member 12a for rotation about an axis b—b offset from and inclined to the axis of rotation a—a of concentric reel member 1a.

Reel member 1a includes a generally cylindrical hollow body portion 5a to which are rigidly fixed bar members 3a, which are preferably formed integrally therewith. The ends of concentric member 1a are closed by members 42 and 43, which form fluid-tight junctions with the inner surface of hollow body portion 5a. Collars 44 and 45 (Figures 8 and 9) locked in place on hollow drive shaft 6a serve to locate it endwise with respect to frame member 12a, portions of which are disposed between said collars. Collar 44 serves as means for locating reel member 1a endwise on hollow drive shaft 6a. As shown in Figure 9, reel member 1a is held against collar 44 by means of bolt 46 threaded into the end of hollow drive shaft 6a.

Suitable packing 47 is provided in a recess in end member 43 of reel member 1a between collar 44 and said end member; similarly, packing 48 is provided between bolt 46 and end member 42, these packings 47 and 48 serving to prevent leakage of fluid from the interior of reel member 1a.

Heating fluid, such as hot water, steam or the like, is supplied to hollow drive shaft 6a, within which is contained a return tube 49. A plug 50 is provided as shown to prevent the fluid entering the reel from passing directly from the hollow drive shaft 6a to the return tube 49. The heating fluid passes through openings 51 out of hollow drive shaft 6a into the interior of hollow body portion 5a of concentric reel member 1a and thence through openings 52 into return tube 49. In order to supply heating fluid to and remove it from hollow drive shaft 6a, pipes 53 and 54 connected to a suitable fitting 55 (Figure 8) are provided, the fitting 55 being of such design as to conduct the fluid to and from the proper passages. Thus members 1a and 2a, which are preferably made of a metal of good heat conductivity such as aluminum, may be efficiently heated by radiation and conduction to accomplish the drying of the thread on the reel.

The reel as a whole, mounted by means of flange portion 17a, is actuated by means of hollow drive shaft 6a, which is positively rotated by means of bevel gear 18a, shown in Figure 8.

Disposed between the rear end of reel member 1a and supporting member 10a, as shown in Figures 9 to 13, inclusive, are two intermeshing dentated drive elements 32a and 33a one of which is fixed to each of the reel members. As shown in Figures 9, 11 and 13, drive element 32a, which takes the form of a gearlike member having radially extending external teeth 34a, is concentrically mounted upon the rear closure member 43 of reel member 1a by a plurality of bolts 35a. The cooperating drive element 33a, shown in Figures 9, 10 and 12, takes the form of a gearlike member having having radially extending internal teeth 36a, said member being disposed within the periphery defined by the bar members 4a of reel member 2a and held in place on supporting member 10a by means of bolts 38a.

The teeth 34a and 36a of the drive elements 32a and 33a are conjugate, being so formed that despite the displaced relationship of the axes of the reel members with which they are associated, the reel members rotate smoothly and uniformly upon rotation of drive shaft 6a. Due to their conformation, they permit of no contact of the bar members 3a and 4a. As is explained in connection with the embodiment of the invention shown in Figures 1 to 7, inclusive, the teeth of the cooperating drive elements are so formed that no appreciable backlash can occur between the reel members. Consequently, the possibility of breakage due to inertia effects incident to starting and stopping, together with the possibility of sudden variations in the thread tensions due to momentary changes in speed, are completely avoided.

The drive elements 32 and 33 or 32a and 33a may, of course, be formed integrally with the reel members or with their respective supporting means. If separately formed, they may be permanently affixed thereto. It is, however, preferable that said drive elements be demountably supported, in order that they may be removed or replaced if desired, and that they be made of materials different from and having better wearing qualities than the reel members with which they are associated. In the illustrated embodiments of the invention, each of the drive elements can be readily removed from its supporting means by removal of the bolts or pins holding it in place.

Moreover, the internally toothed element 33 or 33a is preferably formed of steel while the externally toothed element 32 or 32a cooperating therewith is formed of Bakelite-impregnated fabric. It has been found that if the cooperating drive elements are formed of this combination of materials they will continue to operate for long periods of time with little, if any, wear, even though not lubricated. It is desirable for several reasons that the necessity for lubricating the drive elements be obviated; viz., because of the difficulty of obtaining access to such drive elements without dismantling the reel as a whole; because the escape of lubricants therefrom would soil the thread and contaminate the processing fluids; and because in a heated reel it would be difficult, if not impossible, to maintain a lubricant at the high temperatures of operation. However, other combinations of materials than those described may be employed; indeed, one or both of the driving elements may, if desired, be formed of a material which is self-lubricated.

Thus, the invention provides, among other things, an improved thread-advancing reel embodying means for maintaining the bar members thereof completely out of contact at all times, this even though one reel member is driven from the other. In consequence of the employment of such a thread-advancing reel, wear of the reel itself is minimized, difficulties due to irregularities in the shape of the reel members are eliminated, and for the first time it becomes practicable to drive one reel member from the other at a substantially constant speed. The herein-described embodiments of the invention are of course illustrative; as a matter of fact, various modifications may be made therein and various devices embodying the invention may be employed in uses other than those indicated without departing from the spirit of the invention.

It is intended that the patent shall cover, by suitable expression in the appended claims, whatever features of patentable novelty reside in the invention.

What is claimed is:

1. A thread-advancing reel comprising two interdigitating sets of bar members, each of said sets as a whole being mounted for rotation about an axis displaced from that of the other set; a demountable externally toothed gear adapted to rotate concentrically with one of said sets of bar members; and, surrounding and meshing with said demountable externally toothed gear, a demountable annular internally toothed gear adapted to rotate concentrically with the other set of bar members.

2. A device of the character described in claim 1 in which one of said gears is formed of metal and the other of non-metallic material.

3. A thread-advancing reel comprising two rigid, interdigitating sets of bar members each of which is substantially circular in cross section but varies in cross sectional diameter along the length thereof mounted for rotation about axes inclined to each other, the axis of each of said sets of bar members lying within the periphery defined by the other set of bar members; an externally toothed gear adapted to rotate concentrically with one of said sets of bar members; and, surrounding and meshing wih said externally toothed gear, an internally toothed gear adapted to rotate concentrically with the other set of bar members, at least one of said gears being separately formed and rigidly fixed to its corresponding set of bar members.

4. A flared thread-advancing reel comprising a plurality of interdigitating sets of bar members, each of said sets as a whole being mounted for rotation about an axis displaced from that of the other set; a separately formed externally toothed gear operatively associated with one of said cage members; and, surrounding and meshing with said externally toothed gear, a separately formed internally toothed gear operatively associated with the other of said sets of bar members.

5. A tapered thread-advancing reel comprising a plurality of interdigitating sets of bar members, each of said sets as a whole being mounted for rotation about an axis displaced from that of the other set; a separately formed externally toothed gear operatively associated with one of said cage members; and, surrounding and meshing with said externally toothed gear, a separately formed internally toothed gear operatively associated with the other of said sets of bar members.

6. A thread-advancing reel comprising two interdigitating sets of bar members extending lengthwise of the reel, each of said sets as a whole being mounted for rotation about an axis displaced from that of the other set; a member having external radial teeth formed thereon operatively associated with one of said sets of bar members; and, engaging said externally toothed member, a member operatively associated with the other of said sets of bar members having formed therein a number of internal radial teeth equal to the number of teeth on said externally-toothed member, said internally- and externally-toothed members having cooperating bearing surfaces which intermesh in substantially rolling relation without backlash or binding, thereby preventing the bar members of said sets from contacting.

7. A device of the character described in claim 6 in which the teeth of one of said radially-toothed members are formed of metal and the teeth of the other are formed of non-metallic material, the materials of said teeth cooperating to provide good wearing qualities in the absence of lubrication.

8. A thread-advancing reel comprising two interdigitating sets of bar members extending lengthwise of the reel, each of said sets as a whole being mounted for rotation about an axis displaced from that of the other set; a separately formed gear having external radial teeth formed thereon operatively associated with one of said sets of bar members; and, engaging said externally-toothed gear, a separately formed gear operatively associated with the other of said sets of bar members having formed therein a number of internal radial teeth equal to the number of teeth on said externally-toothed gear, said internally- and externally-toothed gears having cooperating bearing surfaces which intermesh in substantially rolling relation without backlash or binding, thereby preventing the bar members of said sets from contacting.

9. A device of the character described in claim 8 in which one of said radially-toothed gears is formed of metal and the other radially-toothed gear is formed of non-metallic material, the metallic and non-metallic materials of said gears cooperating to provide good wearing qualities in the absence of lubrication.

10. A cantilever thread-advancing reel comprising a frame member which is supported from one end only; a first set of spaced, longitudinally-extending bar members rotatably mounted on the unsupported end of said frame member; a second set of spaced, longitudinally-extending bar members alternating with those of said first set of bar members likewise rotatably mounted on the unsupported end of said frame member, said second set of bar members including a hub member rotatably carried by said frame member to which hub member are rigidly fixed the bar members of said second set; a member having external radial teeth formed therein operatively associated with one of said sets of bar members; and, surrounding said externally-toothed member, a member operatively associated with the other of said sets of bar members having internal radial teeth formed therein equal in number to, meshing with, and characterized by profiles which are conjugate in respect of the profiles of the teeth on said externally-toothed member whereby to keep the bar members of said sets out of contact, the radially-toothed member associated with said second set of bar members being carried by said hub member.

11. A device of the character described in claim 10 in which the teeth of one of said radially-toothed members are formed of metal and the teeth of the other are formed of non-metallic material, the materials of said teeth cooperating to provide good wearing qualities in the absence of lubrication.

12. A cantilever thread-advancing reel comprising a frame member which is supported from one end only; a first set of spaced, longitudinally-extending bar members rotatably mounted on the unsupported end of said frame member; a second set of spaced, longitudinally-extending bar members alternating with those of said first set of bar members likewise rotatably mounted on the unsupported end of said frame member, said second set of bar members including a hub member rotatably carried by said frame member to which hub member are rigidly fixed the bar members of said second set; a separately formed gear having external radial teeth formed therein operatively associated with one of said sets of bar members; and, surrounding said externally-toothed gear, a separately formed gear associated with the other of said sets of bar members having internal radial teeth formed therein equal in number to, meshing with, and characterized by profiles which are conjugate in respect of the profiles of the teeth on said externally-toothed gear whereby to keep the bar members of said sets out of contact, the radially-toothed gear associated with said second set of bar members being carried by said hub member.

13. A device of the character described in claim 12 in which one of said radially-toothed gears is formed of metal and the other is formed of non-metallic material, the materials of said gears cooperating to provide good wearing qualities in the absence of lubrication.

14. A thread-advancing reel comprising two interdigitating sets of bar members, each of said sets as a whole being mounted for rotation about an axis displaced from that of the other set; a member having external radial teeth formed therein structurally associated and adapted to rotate concentrically with one of said sets of bar members; and, surrounding and meshing with said externally-toothed member, a member structurally associated and adapted to rotate concentrically with the other set of bar members having internal radial teeth formed therein equal in number to the teeth on said externally-toothed member, at least one of said radially toothed members taking the form of a gear demountably connected to its associated set of bar members.

GEORGE P. TORRENCE.
RICHARD F. BERGMANN.
WALTER F. KNEBUSCH.

CERTIFICATE OF CORRECTION.

Patent No. 2,255,017. September 2, 1941.

GEORGE P. TORRENCE, ET AL.

It is hereby certified that error appears in the printed specification of the above numbered patent requiring correction as follows: Page 5, first column, line 11, claim 3, for "wih" read --with--; and second column, line 64, claim 12, before "associated" insert --operatively--; and that the said Letters Patent should be read with this correction therein that the same may conform to the record of the case in the Patent Office.

Signed and sealed this 28th day of October, A. D. 1941.

(Seal)

Henry Van Arsdale,
Acting Commissioner of Patents.